June 6, 1944. H. W. OBENAUER 2,350,633
BOLT LOCK
Filed March 19, 1942

INVENTOR.
H. Welton Obenauer
BY

Patented June 6, 1944

2,350,633

UNITED STATES PATENT OFFICE 2,350,633

BOLT LOCK

Harlen Welton Obenauer, Birmingham, Mich.

Application March 19, 1942, Serial No. 435,329

2 Claims. (Cl. 70—232)

This invention relates to bolt locks and has for its object to provide a device which will effectively cover the head of a bolt to protect the bolt against unauthorized removal.

It has become increasingly important during the present period of national emergency, for instance, to guard against the theft of automobile wheels and the like. Conventional bolts may be removed by an ordinary wrench so that a tire thief usually finds it easier to take the wheel and tire than the tire alone. It is therefore the main object of this invention to provide a bolt cover which may be secured over a bolt head, which has an exterior surface difficult to grip and impossible to remove simply by rotation, and which may be removed only by a key.

Another object is to provide a novel washer through which a bolt may be inserted, the washer having extensions or wings extending outwardly therefrom well beyond the contour of the head of the bolt for engagement with the guard proper.

Figure 1:
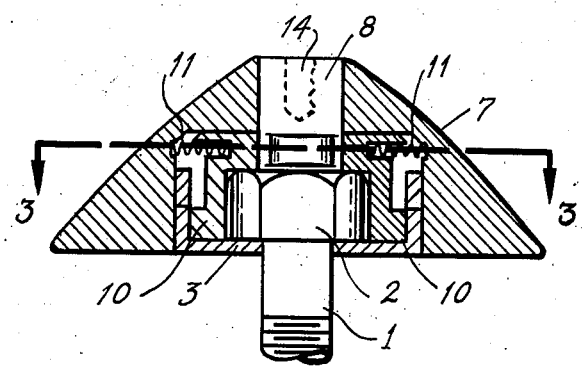
Figure 2:
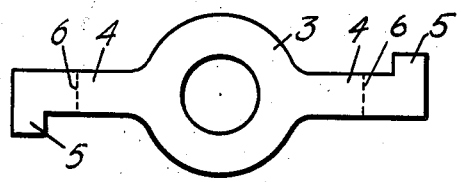
Figure 3:
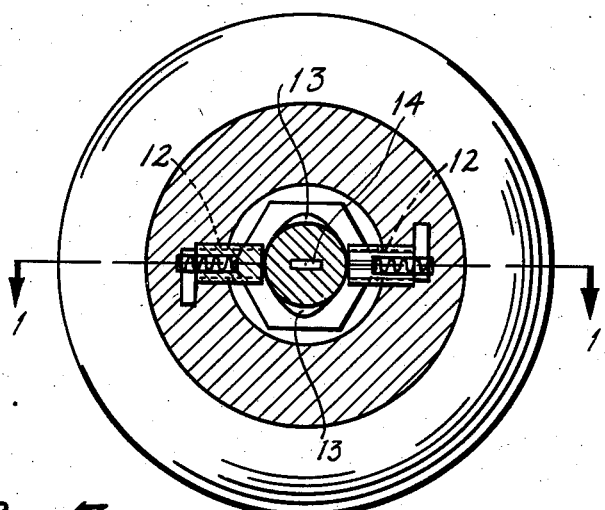

Other objects and advantages will become more fully apparent as reference is had to the accompanying drawing wherein my invention is illustrated, and in which Figure 1 is a diametric section through my improved guard taken along the line 1—1 of Figure 3, and showing its assembly on a bolt, Figure 2 is an elevation of the guard washer, and Figure 3 is a horizontal section taken along the line 3—3 of Figure 1.

More particularly, 1 indicates the shaft of a bolt having a head 2. This may be of conventional type such as is used, for instance, as the retaining means for automobile wheels. In applying my invention thereto, I first insert the bolt shaft 1 through a washer-like member 3 composed of a central toroidal or ring-shaped portion having lateral extensions 4 of substantial length. Each extension 4 terminates in an end 5 extending normally thereto to constitute a lock keeper. The width of the central portion is approximately equal to or slightly less than the width of that portion of the bolt head 2 radially outwardly of the bolt shaft 1 and the extensions 4 are of such length that the ends may be turned up along the bend lines 6, the turned up ends being substantially spaced from the bolt head 2.

After the bolt shaft 1 is inserted in the hole in the washer 3 the bolt may be screwed down so that head 2 presses firmly thereagainst. The guard is then placed thereon.

The guard is composed of a body portion 7 of frusto-conical exterior shape having a key receiving lock cylinder or barrel 8 co-extensive with the small base thereof and extending axially into the body 7. The body 7 is hollow to receive the head 2 with the washer 3. The bolt head 2 resides between two locking plungers 10 which are urged toward the barrel 8 by springs 11 so that the outer ends of the washer 3 reside between the plungers 10 and the inside walls of the guard 7. The plungers 10 are flanged as indicated at 12 to engage shelves in the guard body.

The barrel 8 has opposed cams 13 thereon so that when it is rotated by a key inserted in the key-hole 14, these cams 13 push the plungers 10 outwardly so that they each underpass the projections or keepers 5 thus firmly locking the guard body with respect to the washer 3 over the bolt head 2. The plungers 10 are so shaped as to substantially contact the extensions 4 so that the guard body may not be elevated by insertion of a screw driver or other pointed instrument.

Various changes may be made without departing from the spirit of my invention and I therefore desire to be extended protection within the scope of the appended claims in which what I claim is:

1. A guard for a bolt comprising a circular washer having lateral extensions, said washer having a central opening through which the shaft of the bolt to be guarded is insertable for residence against the head of said bolt, said extensions being integral with and extending radially outwardly from said washer and each terminating in a circumferentially extending keeper, said keepers being substantially normal to said extensions, a guard body overlying said bolt head and said washer, said guard body having a smoothly curved exterior surface of frusto-conical shape and a hollow portion, a lock insertable axially of said body with the key receiving end thereof occupying the small base of said frusto conical body, lock plungers traversable in said hollow portion, said bolt head and said washer with its keepers residing in said hollow portion, said plungers being traversable radially of said guard body into and out of engagement with said keepers, said plungers being adapted for actuation by a removable key for causing traversal of said plungers.

2. A guard for a bolt comprising a circular washer having lateral extensions, said washer having a central opening through which the shaft of the bolt to be guarded is insertable for residence against the head of said bolt, said washer having extensions therefrom each extending laterally outwardly for a substantial distance and then normal thereto, said extensions terminating in further extensions normal thereto in the plane thereof and together therewith constituting keepers, a guard body of frusto-conical shape having one end of a key receiving lock cylinder occupying the small base thereof, said guard body having an open space in the large base thereof adapted to house the head of said bolt and said washer, said open space occupying materially less area than the entire area of said base and being concentric with said base, said guard body having spring pressed lock plungers traversable radially of said lock cylinder against the compression of said springs into engagement with said keepers, said lock plungers when in unlocking position residing between said lock cylinder and said keepers and substantially contacting said washer extensions at all times.

HARLEN WELTON OBENAUER.